United States Patent Office 2,972,486
Patented Feb. 21, 1961

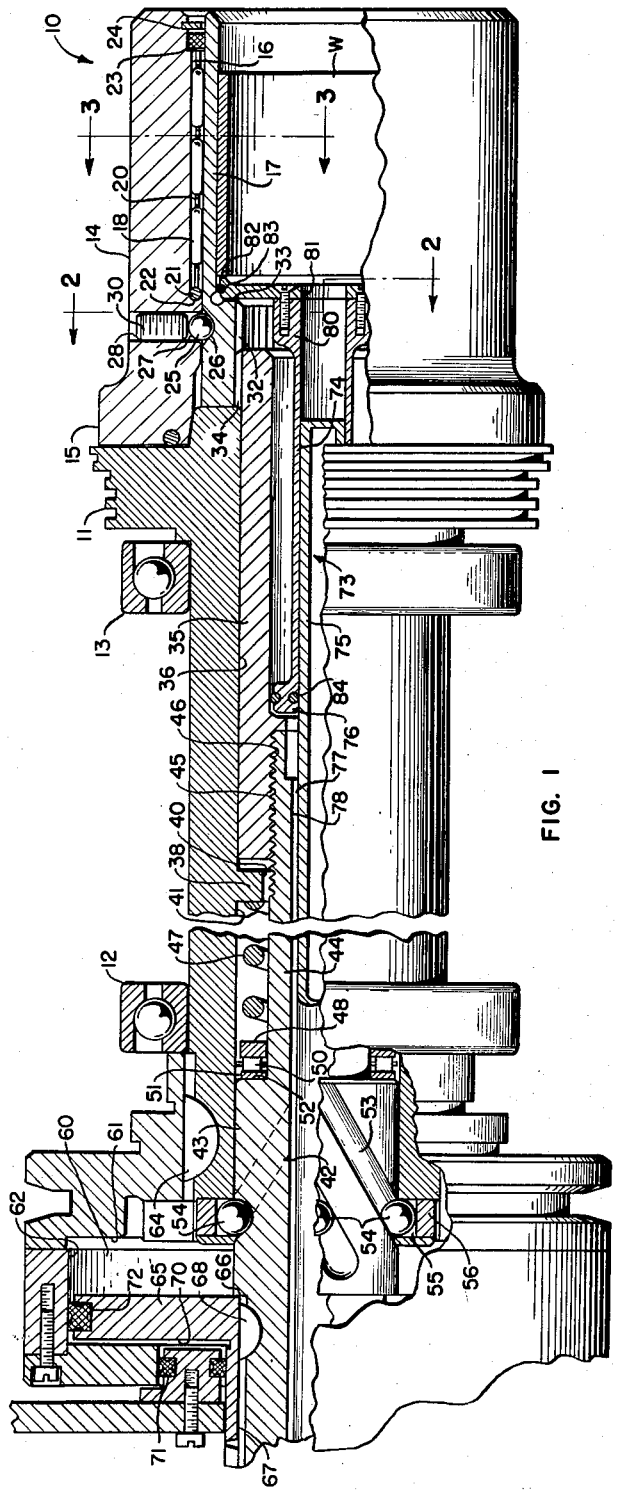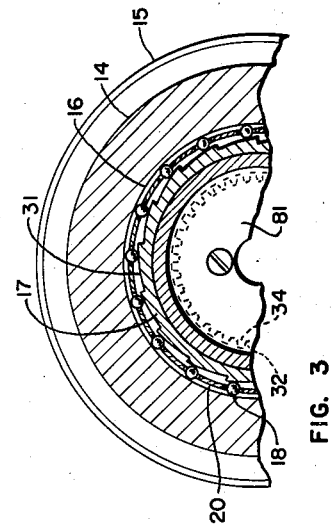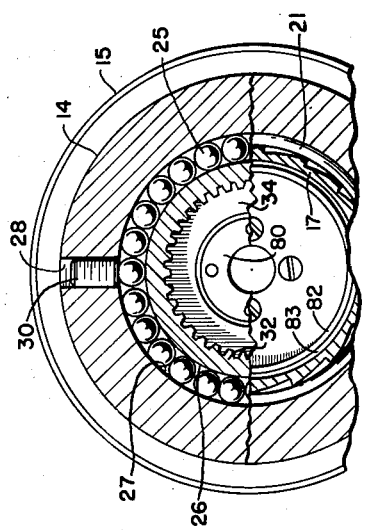

2,972,486

INDIRECT CHUCKING

Bernard R. Better, Chicago, Ill., assignor to Scully-Jones and Company, Chicago, Ill., a corporation of Illinois Filed Feb. 5, 1959, Ser. No. 791,431

9 Claims. (Cl. 279—2)

This invention relates, in general, to machine tooling, and, in particular, to a new and improved means for chucking thin walled workpieces on internal grinding machines.

It is a principal object of this invention to provide a new and improved chuck for internal grinding machines and the like which will hold thin walled cylindrical parts accurately on their outer diameters to grind their internal bores.

Heretofore, the accurate grinding of cylindrical internal bores of thin walled workpieces on grinding machines has been very difficult. It can be appreciated that if the workpiece is heavy walled, most conventional chucks will perform sufficiently well since the holding of the workpiece does not create problems of distortion and the like on the internal bores. However, if the workpieces have thin walls, where the walls will not support the gripping forces of a conventional chuck, it is most difficult to prevent distortion from the desired cylindrical internal periphery throughout the length of the bore.

I have improved chucks for workpieces of this type by the provision of a power operated chuck adapted principally to hold a thin walled workpiece throughout its length and about its external periphery with a minimum of distortion, thus permitting the internal bore of the workpiece to be ground accurately. My new and improved chuck comprises a liner which has circumferentially arranged cam surfaces coacting with rollers spaced angularly in a cage. These rollers ride up and down on the cam surfaces of the liner and react against the inside of a hardened main body member into which the liner and cam surfaces are incorporated. Rotation of the liner causes the rollers to rid up the cams, producing both an inward and outward force. The outward force is taken up by the hardened main body member but the inward force will cause the liner to contract and thus reduces its inside diameter, producing a chucking operation on the full length covered by the rollers. The rollers are closely spaced circumferentially about the liner, which prevents the creation of excessive differences on the inside diameter between the roller or cam supported and the non-supported section of the liner; the difference between these two sections being insignificant and hardly measurable. The means for causing the rollers to actuate the liner is a power actuated mechanism comprising, generally, a preloaded spring, and a spiral arangement operated either by the reaction of the preloaded spring or by a power actuated piston, causing this liner to rotate, thus operating the roller cam arrangement.

Accordingly, it is a specific object of my invention to provide a new and improved power actuated chuck comprising a liner and a main body member with a roller arrangement therebetwen whereby upon rotational movement of the liner the rollers ride up cams and react against the main body member to contract the liner and firmly grip a thin walled workpiece therebetween.

Still another object of my invention is the provision of a power actuated chuck which will grip a thin walled workpiece throughout its length and with a minimum of distortion.

Still another object of my invention is the provision of a new and improved power actuated mechanism for use in connection with my new and improved chuck for thin walled workpieces.

Other and more particular objects of my invention will be apparent to those skilled in the art from the following description and drawings forming a part hereof and wherein:

Figure 1 is a longitudinal sectional view, partially broken away, illustrating to advantage the inner working parts of a power actuated chucking means for thin walled workpieces constructed in accordance with the teachings of my invention;

Figure 2 is a cross sectional view of my chucking means taken along line 2—2 of Figure 1 and looking in the direction of the arrows; and Figure 3 is another cross sectional view taken along line 3—3 of Figure 1 and looking in the direction of the arrows.

In these drawings, it can be seen that I have illustrated my thin walled chucking mechanism in its entirety as 10, rotatably mounted on a machine tool spindle 11, the latter being driven within a pair of ball bearing means 12, 13 by mechanisms not shown. I have also illustrated a thin walled workpiece which in the embodiment illustrated is a bushing, and indicated in its entirety as W.

My power actuated chuck 10 comprises a main body member 14 of suitable hardened material having a flange 15 by which it may be attached to the spindle 11 by any suitable means (not shown). Main body 14 is cylindrically bored as at 16 to receive a relatively thin liner 17 slightly spaced therefrom. Interposed between the liner 17 and the bore 16 is a plurality of rollers 18 of any suitable length, but preferably substantially the length of the workpiece or longer, disposed in a cage 20; the latter maintaining the rollers in proper relationship about the liner 17. While I have shown three rows of rollers axially aligned, as illustrated in Figure 1, obviously one full length roller could be used. Cage 20 is maintained in proper axial relationship with respect to the main body member 14 and the liner 17 by any suitable means, such as by O-ring seal 21 which abuts against a shoulder 22 formed in the main body member and by bearing ring 23 at the other end of bore 16 and held in place by snap ring 24.

Axial positioning of the body member 14 and the liner 17 is maintained, yet allowing rotational relative movement, by a plurality of steel balls 25 placed in a relatively shallow circumferential groove 26 in the liner 17 to the left of bore 16 and a relatively shallow groove 27 complementing groove 26 in the main body member 14. Balls 25 are located circumferentially and contiguously about the liner and body member, as illustrated in Figure 2, and main body member 14 is provided with a radial bore 28 communicating with the complementary grooves 26, 27 for insertion of the balls 25 therein. The bore 28 may be closed by a screw 30 or the like threadedly disposed therein.

Turning now, in particular, to Figure 3 where the cross sectional dimensions of the main body member and the liner are illustrated, it can be seen that the outer periphery of the liner 17 is provided with a plurality of inclined or camming surfaces 31, each inclined in the same direction, and corresponding in number to the number of rows of rollers 18 about the periphery of the liner, closely spaced about the periphery thereof. It can be appreciated that if the liner is rotated counter-clockwise, the rollers 81 will roll up the inclined camming surfaces 31 so as to wedge against the bore 16 of the main body member 14 and against the outer periphery of the liner 17. Liner 17, being the thinner of the two, and subject to the reactive forces herein described, will tend to contract and squeeze the workpiece W. The large number of rollers 18 and camming surfaces 31 tend to give a smooth contraction to the liner so that the workpiece W is held chucked tightly with a minimum of peripheral distortion. Obviously, it is preferred that the number of rows of rollers 18 be selected so as to provide a minimum of space between the rollers and so that the difference between the supported and the unsupported sections is at a minimum. I found in the practical embodiment of my invention that the number shown is satisfactory for this purpose.

As previously mentioned, my thin walled chucking means 10 operatively forms part of a power actuated means which serves to actuate the chucking means 10 to chuck and release the workpiece W. This power actuated chuck means will now be described.

Liner 17 is provided at its inner or left end (as shown in the drawings) with internal splines 32 and a shoulder 33 between splines 32 and bore 16. Splines 32 receive a complementary external spline portion 34 of an axially slidable sleeve member 35 received in a cylindrical bore 36 in the spindle member 11. Bore 36 terminates substantially centrally of the spindle member 11 in a radially inwardly extending ledge 38 having a through bore 40 of lesser diameter than bore 36. The opposite end of the spindle member 11 is also cylindrically bored, as at 41, having the same diameter as the bore 36 to form the other side of ledge 38.

Axially shiftable plunger 42, having head 43 and extension 44 of a lesser diameter than bore 40, is received in bore 41. Extension 44 has a portion 45 threadably received in a threaded counterbore 46 in the sleeve member 35. It can be appreciated that movement of the plunger 42 to the left or to the right will cause movement of the sleeve member 35 to the right or to the left, ultimately causing sliding movement between the splines 32 of liner 17 and the splines 34. A compression spring means 47, encircling extension 44, is bottomed at one end against the ledge 38 and against a liner 48. Liner 48 forms one race for a plurality of roller bearings 50 and with race 51 abutting wall 52 between head 43 and extension 44 and with the wall 52 and race 51 taking up the force of spring 47, the head 43 is urged to the left as shown in the drawings. Head 43, which is cylindrical, is provided on its surface with a plurality of helical or spiral grooves 53 into which a plurality of stationary ball bearings 54 are inserted. Ball bearings 54 are arranged to remain axially stationary so that any movement of the head to the right or to the left rotates the liner 17 through the reaction of the ball bearings in the grooves 53. The stationary disposition of the ball bearings 54 is accomplished by providing a plurality of radial apertures 55 in the spindle 11 with a suitable snap ring 56 holding the balls within the apertures.

In this invention, the previously mentioned helical spring 47, as can be appreciated, reacts against the ledge 38 and liner 48 to urge the head 43 to the left, and means are provided to overcome this spring which will now be described.

In the automatic internal grinding machine, part of which is shown, means defining an air chamber 60 surround the plunger head 43 and forms part of the spindle 11 to rotate therewith, being defined by walls 61, 62, and 63 and suitably affixed to the spindle 11 by Woodruff key and slot 64. An axially movable piston 65 is operatively connected to the plunger 42 through a shoulder 66 and an integral sleeve member 67 which fits over a reduced portion of the plunger head 43 formed when the shoulder 66 is machined. There is further provided a conventional slot and Woodruff key 68 so that the piston 65 will not only move the plunger head to the right but will also rotate therewith upon rotation of the plunger head, through the operation of this Woodruff key and slot 68. In this invention, air is introduced into the chamber 60 from a suitable source of air pressure (not shown) and against the backside 70 of the piston 65. Leakage is prevented by conventional O-ring seals, such as 71 and 72, wherever thought necessary or desirable. Thus, air under pressure introduced behind the piston, will tend to move the plunger 42 to the right, overcoming the spring 47. Through the reaction of the ball bearings 54 in the spiral grooves 53, the piston 35 will release the workpiece W.

My invention is further adapted to operatively form part of an air pressure responsive ejector mechanism, indicated in its entirety as 73, and comprising an elongated hollow piston member 74 coaxial with the piston member 35 and plunger 42. Piston 74 telescopingly encompasses a hollow rod 75 which supports the piston 74 and the latter is provided with an enlarged head 76, subject to air pressure introduced through the space 77 provided between rod 75 and bore 78 in the plunger 42. Air thus introduced will move the piston 74 to the right. At the opposite end of the piston 74 from head 76 there is provided an enlarged head 80 to which is attached a relatively large plate-like member 81 having a diameter substantially the diameter of the bore of the liner 17 so that when the workpiece W is released, air introduced behind the head 76 will push the workpiece W out of the liner. It is to be noted that the plate-like member 81 must substantially conform with the diameter of the workpiece W so that the ejector flange 82 thereof is in contact with the end of the workpiece W as illustrated in the drawing. Suitable O-ring seals, such as at 83 and 84, may be provided where thought necessary or desirable.

From the above description, it can be seen that a workpiece W may be inserted into the liner when the piston 65 is subject to air pressure introduced in chamber 60 by reason of the fact that movement of the plunger head 43 causes the rollers to roll down the camming surfaces 31 and allow the liner 17 to expand. When the workpiece W is placed in the bore of the liner 17 the air ejector mechanism is pushed to the left with the head 80 against the shoulder 33 of the main body member because air pressure in the space 77 will have been vented to low pressure. When the air behind the piston 65 has been vented to low pressure, the reaction of the spring 47 will tend to move the plunger head 43 to the left, causing the rollers 18 to again roll up the camming surfaces 31 to contract the liner and chuck the workpiece W. After the grinding of the bore in the workpiece W, air can again be admitted behind the piston 65 to release the workpiece W and allow the air ejector mechanism 33 to eject the same. This operation is obviously repetitive, and while I have described the same in connection with a spring and air power actuated mechanism as well as in connection with an air ejector mechanism, any suitable means of rotating the liner could be provided to operate my chucking means and any suitable ejector mechanism could be used, or none at all, if desired. I have found also that any positive action on the part of the release mechanism to unchuck the workpiece is not necessary since the only power required at piston 65 is to overcome the spring 47 so that the resiliency in the liner 17 will cause the rollers to roll down the cams and release the workpiece W, and while I have described my chuck in connection with thin walled workpieces, obviously, while the problems of distortion are less in thick walled workpieces, my chuck could be used to chuck such pieces equally as well.

Wherein the various parts of my invention have been referred to as located in a right or left or an upper or lower or an inward or outward position, it will be understood that this is done solely for the purpose of facilitating description and that such references relate only to the relative positions of the parts as shown in the drawings.

Also, it is to be understood that many changes and modifications may be made without departing from the scope or spirit of the invention and the invention is defined and comprehended solely by the appended claims which should be construed as broadly as the prior art will permit.

I claim:

1. A chuck adapted for chucking a thin walled workpiece comprising a body member, a relatively thin liner received in said body member, said liner having means for receiving the workpiece therein, cam means for contracting the liner to chuck the workpiece operable by rotation of the liner, means to actuate said contracting means, and means to eject the workpiece from the liner when said actuating means is inoperative.

2. A chuck adapted for chucking a thin walled workpiece comprising a body member, a relatively thin liner received in said body member, said liner having means for receiving the workpiece therein, cam means for contracting the liner to chuck the workpiece operable by rotation of the liner, and means to actuate said contracting means, said actuating means comprising an axially and rotatably movable plunger operatively connected to the liner for rotation thereof, and means to rotate and axially move said plunger.

3. A chuck adapted for chucking a thin walled workpiece comprising a body member, a relatively thin liner received in said body member, said liner having means for receiving the workpiece therein, means for contracting said liner to chuck the workpiece, means to actuate said contracting means, said actuating means comprising an axially and rotatably movable plunger, rotating means for rotating said plunger, a spring biased to move said plunger axially in one direction, thereby also rotating said plunger in one direction by operation of said rotating means.

4. A chuck adapted for chucking a thin walled workpiece comprising a body member, a relatively thin liner received in said body member, said liner having means for receiving the workpiece therein, means for contracting said liner to chuck the workpiece, means to actuate said contracting means, said actuating means comprising an axially and rotatably movable plunger, rotating means for rotating said plunger, a spring biased to axially move said plunger axially in one direction, thereby also rotating said plunger by operation of said rotating means, and means rendering said actuating means inoperative to release the workpiece.

5. A chuck adapted for chucking a thin walled workpiece comprising a body member, a relatively thin liner received in said body member, said liner having means for receiving the workpiece therein, means for contracting said liner to chuck the workpiece, and means to actuate said contracting means, said actuating means comprising an axially and rotatably movable plunger, rotating means for rotating said plunger, a spring biased to move said plunger axially in one direction, thereby also rotating said plunger in one direction by operation of said rotating means, and means rendering said actuating means inoperative to release the workpiece comprising power responsive means to overcome said spring and move said plunger axially in the direction opposite from said first movement, thereby also rotating said plunger in the opposite direction by operation of said rotating means.

6. A chuck adapted for chucking a thin walled workpiece comprising a body member, a relatively thin liner received in said body member, said liner having means for receiving the workpiece therein, roller and camming means for contracting said liner to chuck the workpiece, and means to actuate said roller and camming means, said actuating means comprising an axially and rotatably movable plunger, rotating means for rotating said plunger, a spring biased to move said plunger axially in one direction thereby also rotating said plunger in one direction by operation of said rotating means to cause said rollers to roll up said camming means, and means rendering said actuating means inoperative to release the workpiece comprising power responsive means to overcome said spring and move said plunger in the opposite direction, thereby also rotating said shaft in the opposite direction by rotation of said rotating means to allow said rollers to roll down said camming means.

7. A chuck adapted for chucking a thin walled workpiece comprising a body member, a relatively thin liner received in said body member, said liner having means for receiving the workpiece therein, means for contracting said liner to chuck the workpiece comprising a plurality of camming surfaces formed about the outer periphery of said liner, rollers arranged about the periphery of said liner and between the body member and the liner so that rotative movement of said liner relative to said body member causes said roller to ride up said camming surfaces to contract said liner radially, and means to actuate said contracting means, said actuating means comprising an axially and rotatably movable plunger rotating means for rotating said plunger, a spring biased to move said plunger axially in one direction thereby also rotating said plunger in one direction by operation of said rotating means, and thus rotate said liner in the direction so that said rollers roll up said camming surfaces, and means rendering said actuating means inoperative to release the workpiece comprising power responsive means to overcome said spring and move said plunger axially in the opposite direction, thereby also rotating said shaft in the opposite direction by operation of said rotating means to allow said rollers to roll down said camming surfaces.

8. A chuck adapted for chucking a thin walled workpiece comprising a body member, a relatively thin liner received in said body member, said liner having means for receiving the workpiece therein, means for contracting said liner to chuch the workpiece comprising a plurality of camming surfaces formed about the outer periphery of said liner, and tangential to said outer periphery, a plurality of rollers disposed about said outer periphery and having their axes of rotation parallel to the axis of said liner, and arranged so that rotational movement of said liner with respect to said body member causes said rollers to ride up said camming surfaces to contract said liner radially, means for holding said liner axially immovable, but allowing rotational movement with respect to said body member, means to actuate said contracting means, said contracting means comprising an axially and rotatably movable plunger, rotating means for rotating said plunger, a spring biased to move said plunger axially in one direction, thereby also rotating said plunger in one direction by operation of said rotating means and thus rotate said liner, causing said rollers to roll up said camming surfaces, and means rendering said actuating means inoperative to release the workpiece comprising power responsive means to overcome said spring and move said plunger axially in the opposite direction, thereby also rotating said plunger in the opposite direction by operation of said rotating means to allow said rollers to roll down said camming means, said holding means preventing any axial movement of said liner when said actuating means and said means rendering said actuating means inoperative are respectively operative, said liner being further provided with means permitting axial movement of said plunger with respect thereto.

9. A chuck adapted for chucking a thin walled workpiece comprising a body member, a relatively thin liner received in said body member, said liner having means for receiving the workpiece therein, means for contracting said liner to chuch the workpiece, means to actuate said contracting means, said actuating means comprising an axially and rotatably movable plunger, rotating means for rotating said plunger, a spring biased to move said plunger axially in one direction, thereby also rotating said plunger in one direction by operation of said rotating means, means rendering said actuating means inoperative to release the workpiece comprising power responsive means to overcome said spring and move said plunger axially in the opposite direction thereby also rotating said shaft in the opposite direction by operation of said rotating means, and means to eject said workpiece from the liner when said actuating means is inoperative.

References Cited in the file of this patent

UNITED STATES PATENTS

| | | |
|---|---|---|
| 1,519,386 | Urquhart | Dec. 16, 1924 |
| 2,603,496 | Richert | July 15, 1952 |
| 2,826,420 | Klingler | Mar. 11, 1958 |
| 2,843,388 | Butler | July 15, 1958 |
| 2,859,041 | Sloan | Nov. 4, 1958 |